(12) United States Patent
Katsura et al.

(10) Patent No.: US 6,898,297 B2
(45) Date of Patent: May 24, 2005

(54) DIGITAL WATERMARK EMBEDDING METHOD, DIGITAL WATERMARK EXTRACTING METHOD, RECORDING MEDIUM, IMAGE RECORDING DEVICE, AND IMAGE REPLAYING DEVICE

(75) Inventors: Takashi Katsura, Fukuoka (JP);
Hisashi Inoue, Fukuoka (JP); Koji Sugishita, Munakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 695 days.

(21) Appl. No.: 09/885,730

(22) Filed: Jun. 20, 2001

(65) Prior Publication Data

US 2001/0053238 A1 Dec. 20, 2001

(30) Foreign Application Priority Data

Jun. 20, 2000 (JP) ..................................... 2000-184865

(51) Int. Cl.[7] .............................................. G06K 9/00
(52) U.S. Cl. ..................................................... 382/100
(58) Field of Search ....................... 382/100; 370/522; 714/100, 6, 746, 776, 798, 799, 800

(56) References Cited

U.S. PATENT DOCUMENTS 6,404,781 B1 * 6/2002 Kawamae et al. .......... 370/522
6,725,372 B1 * 4/2004 Lewis et al. ................ 713/176
6,731,774 B1 * 5/2004 Hosaka et al. .............. 382/100

FOREIGN PATENT DOCUMENTS

| JP | 11085550 | 3/1999 | ...................... 11/8 |
| JP | 11215452 | 8/1999 | .................... 5/765 |
| JP | 11308564 | 11/1999 | ...................... 5/91 |

* cited by examiner

*Primary Examiner*—Jose L. Couso
*Assistant Examiner*—Tom Y. Lu
(74) *Attorney, Agent, or Firm*—Darby & Darby

(57) ABSTRACT

Embedding data to be embedded as a digital watermark is acquired. Packing data is formed in which the embedding data is repeatedly connected three times or more sequentially without interval. Real embedding information is formed such that a redundancy bit with a fixed length that is used for an error correction of an information bit is added immediately after the information bit in which the packing data is subdivided into data each having a fixed length. The real embedding information is embedded into the image data itself. The embedding mechanism for the information is not easily understood, and security level is high.

18 Claims, 5 Drawing Sheets

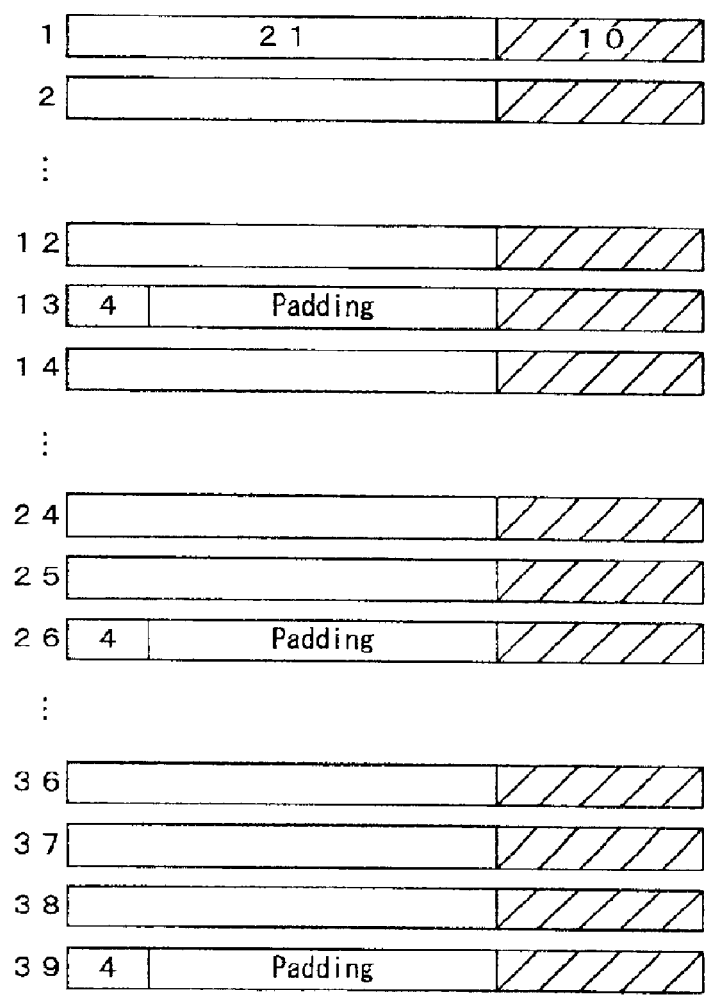

DIGITAL WATERMARK EMBEDDING METHOD, DIGITAL WATERMARK EXTRACTING METHOD, RECORDING MEDIUM, IMAGE RECORDING DEVICE, AND IMAGE REPLAYING DEVICE

BACKGROUND OF THE INVENTION

This invention relates to a digital watermark embedding method and its related art that are capable of improving the evidential reliability of digital image data.

With the spread of digital still cameras and video cameras, in addition to conventional and widely used silver bromide photography, digital image data (hereinafter designated simply "image data") is now easy to use.

Image data can be input into an information-processing device, such as a personal computer, can be edited using image processing software. For example, part of the image data can be cut off and replaced with other images. With digital image processing, a level is reached in which even the eyes of a professional are unable to discover whether an image is an edited image or an entirely original image.

On the other hand, it is very difficult to edit an image taken with silver bromide photography. In other words, the probability is very low that objects on a silver bromide photograph are falsified. Accordingly, it may be said that the silver bromide photography has high credibility and high evidential reliability.

In contrast, it must be said that digital image data can be easily falsified by editing. Accordingly, the evidential reliability of a digital image is low in the absence of measures to improve the credibility of the digital image data.

Cases where the characteristics of the image data are abused never cease. For example, let it be supposed that an offender X has maliciously falsified image data for the purpose of casting aspersions on a person A. First, the offender X prepares an undesirable base image (for example, an image of violent or obscene scenes) containing an image of a person A. Then the offender X substitutes only a face part of another person on this base image for the face of the person A. Thereafter, the offender X posts this image on a web site of the Internet to slander the person A in support of a false story about the person A. Besides such defamatory activity, other crimes or unfair acts of falsifying image data are now made possible by the ease with which a digital image can be edited.

In response to this problem, there are demands for a technique capable of judging whether image data has been falsified or not, and capable of preventing the falsification beforehand, and, additionally, capable of improving the evidential reliability of digital image data.

As a solution thereto, a technique in which a digital signature is attached to image data can be mentioned (see Japanese Unexamined Patent Publication Nos. Hei-11-215452 and Hei-11-308564), the disclosure of which is hereby incorporated by reference.

However, in light of these references, the digital signature can be easily removed from the image data. With the digital signature removed, a judgment on falsification becomes impossible. Further, the amount of image data is increased by the data of the digital signature. As a result, when the amount of digital data storage is limited, the number of sheets of images that can be recorded is reduced.

Further, in most cases, image data is irreversibly compressed and encoded, before recording. Because the image data before compression is different from the image data that has been compressed, if a digital signature is applied to image data before compression/encoding, the digital signatures on the original and the compressed image data in the two cases are different whether or not the digital data has been falsified. For this reason, if the image data is compressed, the digital signature is applied to image data after compression/encoding.

If the image data is falsified before compression, a decision on whether or not falsification has occurred cannot be based on the digital signature. Further, each time compression/extension processing is repeated, a new digital signature must be added to the compressed digital data. This is not practical.

Thus, the technique of attaching a digital signature to image data doesn't give sufficient evidential reliability to the image data.

In consideration of the foregoing, the idea of embedding a digital watermark into image data itself and making a judgment on falsification on the basis of this digital watermark can be proposed as a technique in which an error rate is reduced to a negligible extent in spite of the fact that compression/extension is performed or errors occur in data transmission. Additionally, the following two respects are needed practically.

(A) The embedding mechanism of the digital watermark is not easily understood. If the embedding mechanism is easily understood, there is a chance that the digital watermark itself might be falsified, with a resulting reduction in its credibility.

(B) The amount of data to be embedded should be as small as possible. This is for economical efficiency in information processing.

Referring to FIG. 6, as disclosed in Japanese Unexamined Patent Publication No. Hei-11-85550, the point hereof will be hereinafter described in detail. It is assumed that an embedding data length is 32 bytes (256 bits). A code term length is 31 bits containing 21 information bits and 10 redundancy bits for error correction.

First, when recording with an embedded digital watermark, the following steps are executed.

(1) The embedding data (256 bits) is subdivided for each information bit (21 bits). Herein, the end of the embedding data situated at the 13th code term has only four bits. Four bits is smaller than the number of information bit (21 bits). Padding (dummy data) of either "1" or "0" is applied to all the remaining bits (21−4=17 bits).

(2) Thereafter, redundancy bits (10 bits) of the 1st to 13th code terms are added. Then 1st to 13th code terms after the redundancy bits are added are brought together into one as unit data.

(3) Thereafter, information obtained by repeating the unit data three times for a later majority decision (three sets in the total of the 1st to 13th code terms, 14th to 26th code terms, and 27th to 39th code terms) is defined as real embedding information.

(4) The real embedding information is embedded into image data, and it is stored on a recording medium.

Next, when reproduced (i.e., when the digital watermark is extracted), the following steps are executed.

(a) The image data and the real embedding information are separated and extracted from the recording medium.

(b) Based on the image information, reproduction is carried out.

(c) The real embedding information is divided into three parts, and the same unit data, repeated three times, are extracted.

(d) The error correction of a corresponding information bit is carried out by a redundancy bit.

(e) A majority decision is made regarding the corresponding bit of each unit data that has been extracted, and error correction is performed. For example, a majority decision regarding the first bit of the information bit is made by each first bit of the 1st, 14th, and 27th code terms.

(f) The result of the majority decision is used as embedding data.

Indeed, according to this procedure, the error rate is reduced to a negligible extent in spite of the fact that compression/extension is performed or errors occur in data transmission.

However, the two respects of (A) and (B) mentioned above are not satisfied. That is, since the same unit data is simply repeated three times, high regularity is exhibited, and therefore the embedding mechanism is easily understood. For this reason, there is a fear that the embedded digital watermark itself will be falsified, and the recorded digital data still lacks sufficient evidential reliability.

Further, since dummy data that has been subjected to padding many times appears, there is much useless labor, and this is disadvantageous from the viewpoint of economical efficiency in information processing.

OBJECTS AND SUMMARY OF THE INVENTION

It is therefore an object of the present invention to provide a digital watermark embedding method and its related art that are capable of giving sufficient evidential reliability to image data and capable of reducing useless labor.

Briefly stated, the present invention provides a system in which embedding data to be embedded as a digital watermark is acquired. Packing data is formed in which the embedding data is repeatedly connected three times or more sequentially without interval. Real embedding information is formed such that a redundancy bit with a fixed length that is used for an error correction of an information bit is added immediately after the information bit in which the packing data is subdivided into data each having a fixed length. The real embedding information is embedded into the image data itself. The embedding mechanism for the information is not easily understood, and security level is high.

According to an embodiment of the invention, there is provided a digital watermark embedding method comprising: acquiring embedding data to be embedded as a digital watermark, forming packing data in which the embedding data is repeatedly connected at least three times to be sequential without interval, forming real embedding information in which a redundancy bit with a fixed length that is used for error correction of an information bit is added immediately after the information bit in which the packing data is subdivided into data each having a fixed length, and embedding real embedding information into image data.

According to a feature of the invention, there is provided a recording medium for recording an image comprising: means for acquiring embedding data to be embedded as a digital watermark, means for embedding the digital watermark as real embedding information, means for adding packing data in which the embedding data is repeatedly connected at least three times sequentially without interval, means for adding a redundancy bit with a fixed length that is used for error correction of an information bit immediately after the information bit, and means for subdividing the packing data into data each having a fixed length.

According to a further feature of the invention, there is provided an image recording device comprising: embedding data input means for acquiring embedding data to be embedded as a digital watermark, packing data forming means for forming packing data in which the embedding data is repeatedly connected at least three times sequentially without interval, redundancy bit addition means for forming real embedding information in which a redundancy bit with a fixed length that is used for error correction of an information bit is added immediately after the information bit in which the packing data is subdivided into data each having a fixed length, embedding means for embedding the real embedding information into image data concerned, and output means for writing information onto a recording medium on the basis of the image data concerned in which the real embedding information is embedded.

According to a further feature of the invention, there is provided an image replaying device comprising: image signal output means for outputting an image signal on the basis of information read from a recording medium that records an image concerned in which a digital watermark is embedded as real embedding information, comprising: means for acquiring the real embedding information containing embedding data to be embedded as a digital watermark is acquired, means for repeatedly connecting packing data in which the embedding data is repeatedly connected at least three times to be sequential without interval, and means for adding a redundancy bit with a fixed length that is used for an error correction of an information bit immediately after the information bit in which the packing data is subdivided into data each having a fixed length.

According to a first aspect of the present invention, a digital watermark embedding method has a step of acquiring embedding data to be embedded as a digital watermark, a step of forming packing data in which the embedding data is repeatedly connected at least three times in sequence without any interval, a step of forming real embedding information in which a redundancy bit with a fixed length that is used for error correction of an information bit is added immediately after the information bit in which the packing data is subdivided into data, each having a fixed length, and a step of embedding the real embedding information into the image data.

With this structure, the error rate is reduced to a negligible extent in spite of the fact that compression/extension is performed or errors occur in data transmission.

Additionally, in general, since packing data is used, code terms are entirely different data from each other, and its regularity is low. It is therefore very difficult to understand the embedding mechanism of the digital watermark. Additionally, since the place where padding occurs is limited only to one place in the last code term in the entire real embedding information, embedding can be carried out without adding unnecessary wasteful terms.

According to a second aspect of the present invention, the embedding data is enciphered in addition to the feature of the first aspect of the present invention.

With this structure, even if an embedded digital watermark is extracted by chance, the contents and meaning thereof can be designed not to be understandable. Therefore the safety and evidential reliability of the image data is improved even more.

According to a third aspect of the present invention, the real embedding information is manifoldly embedded after being interleaved in addition to the feature of the first aspect of the present invention.

In general, there is a weak point in a burst error if a BCH code is used for a redundancy bit. However, according to this structure, burst errors are sufficiently dealt with.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 6 is a data structure diagram of conventional real embedding information.

DETAILED DESCRIPTION OF THE PREFERRED EMBODIMENT

Figure 1:
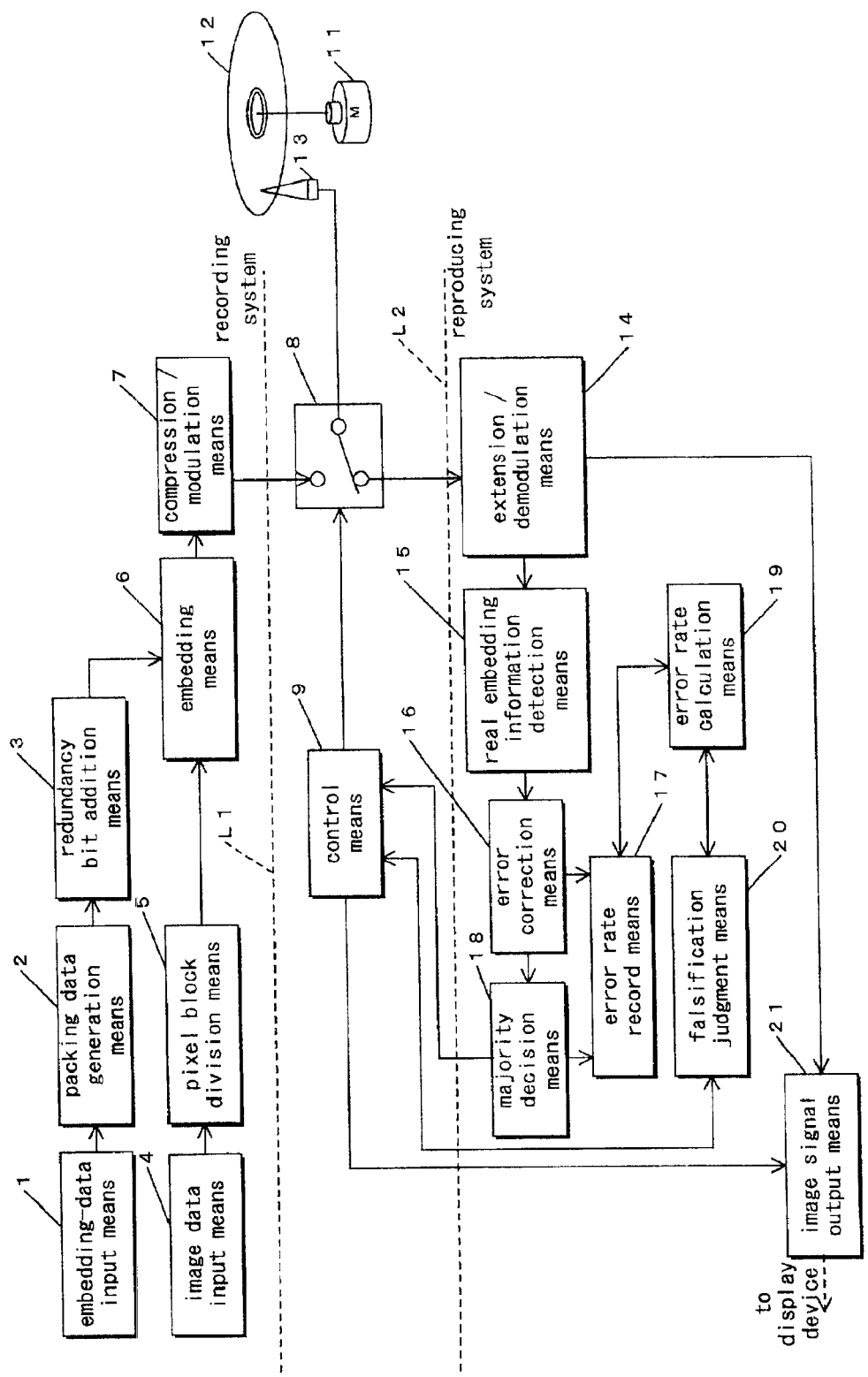
FIG. 1 is a block diagram of an image recording/reproducing device according to an embodiment of the present invention.

Referring to FIG. 1, an embodiment of the present invention is made up of three systems. A recording system is represented above the broken line L1 of FIG. 1. A reproducing system is represented below the broken line L2. A control system is represented between the broken lines L1 and L2. Parts of the present invention may be formed by omitting one of the reproducing-only image replaying device or the recording-only image recording device.

(Recording System)

An embedding-data input means 1 inputs embedding data to be embedded as a digital watermark into image data. Information represented by this digital watermark can be arbitrarily selected, as a matter of course. The digital watermark information may be information on, for example, a device name by which a photograph is taken, a date, a place, or a surrounding sound.

Alternatively, the embedding data input means 1 itself may generate the digital watermark, or a user may input it.

Preferably, the embedding data input means 1 encrypts the embedding data according to conventional cryptography, in order to improve security. For example, when the United States cryptographic standard DES is used, encrypting is carried out using 56 bits as one block.

Figure 2:
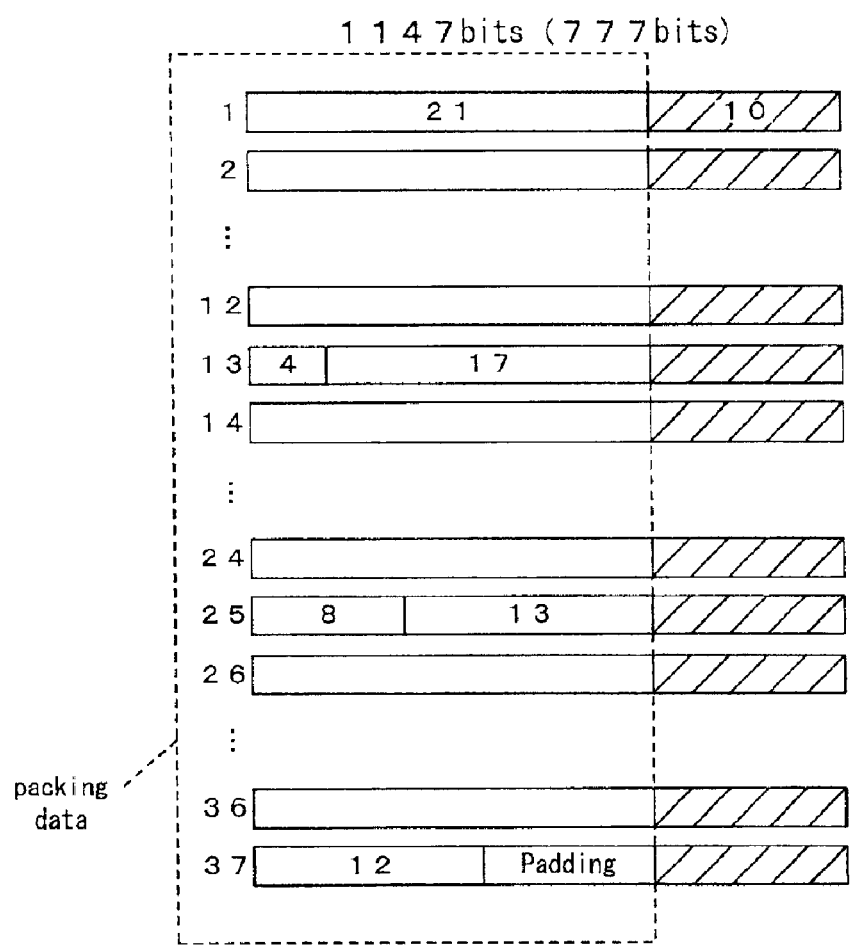
FIG. 2 is a data structure diagram of real embedding information according to the embodiment.

Referring now also to FIG. 2, a packing data generation means 2 generates packing data in which the embedding data input from the embedding data input means 1 are repeatedly connected at least three times in sequence without interval (preferably, an odd number times to avoid an indefinite majority decision).

In this example, an embedding data length is assumed to be 32 bytes (256 bits), with a code term length of 31 bits (wherein information bits are 21 bits, and redundancy bits for error correction are 10 bits), as in FIG. 6.

Further, in this example, since the end of the packing data terminates at the 12th bit of the information bits of the 37th code term, padding is applied to the remaining information bits (21−12=9 bits) of the 37th code term.

Without being limited to this example, the present invention can be likewise applied to an example in which other code terms are used, as a matter of course.

Referring now also to FIG. 2, a redundancy bit addition means 3 adds redundancy bits (10 bits) at the end of the information bits (21 bits) for error correction of the front information bits about each code term. Real embedding information is output.

Herein, this redundancy bit method is arbitrary. For example, a hamming code method, a BCH code method, or a Reed-Solomon method can be followed.

Since BCH (31,21) is used in this embodiment, 10 bits as error correction bits are added to the encrypted data of 21 bits.

An image data input means 4 inputs image data that has been output from, for example, an image pickup means (still or moving picture pickup means) for outputting a digital image signal. As a matter of course, an image-recording device of the present invention can be constructed integrally with this image pickup means.

A pixel block division means 5 outputs image data output originating in the image data input means 4 in the form of one image, or outputs the image data in the form of pixel blocks each having a predetermined size that are obtained by dividing a single image.

An embedding means 6 embeds real embedding information as a digital watermark into the image data input from the pixel block division means 5. The embedded image data is output to a compression/modulation means 7. As a result, the digital watermark is integrally treated the same as the image data itself, and not as an attachment to the image data. It is allowable to embed the digital watermark under any well-known method.

Since the BCH code has a weak point with respect to burst errors, it is preferable to prevent burst errors in such a way that a redundancy bit is added, and multi output is then carried out with interleaves.

The compression/modulation means 7 compresses and modulates the embedded image data input from the embedding means 6, and outputs it to a first terminal of a switching means 8. This method preferably employs MPEG, for example, for a moving picture, and employs JPEG for a still image.

In FIG. 1, a DVD is used as a recording medium 12. Instead, CD-ROMs, DVCs, hard disks, or MOs can be used as the recording medium 12. Since the DVD is used in the device of this embodiment, a driving system includes a spindle motor 11 for rotating the recording medium 12 and a pickup portion 13 serves as an input/output means for reading and writing information in the face of the recording medium 12.

(Control System)

A control means 9 controls each element shown in the figure, and switches the switching means 8 between read and write modes. In the read mode, the switching means 8 connects the pickup portion 13 through a second terminal to an extension/demodulation means 14 of a reproducing system. In the write mode, the switching means 8 connects the output of the compression/modulation means 7 through the first terminal to the pickup portion 13.

(Reproducing System)

The extension/demodulation means 14 extends and demodulates the information read by the pickup portion 13, and outputs the embedded image data to a real embedding information detection means 15. The extension/demodulation means 14 further outputs the embedded image data to an image signal output means 21, and the image signal output means 21 outputs the image signal to a display device. Unlike this embodiment, display may be made on the basis of an image in which the real embedding information is excluded from the embedded image data. Further, the image-reproducing device of the present invention can be constructed integrally with this display device.

The real embedding information detection means 15 applies processing opposite to the processing of the embedding means 6 to the embedded image data input from the extension/demodulation means 14, and then extracts real embedding information, and outputs it to an error correction means 16.

As shown in FIG. 2, the error correction means 16 performs error correction of the information bits (21 bits) situated at the front of the redundancy bits on the basis of the redundancy bits (10 bits). While performing error correction, the error correction means 16 calculates an error rate, and stores the obtained error rate in a first area of an error rate record means 17 as a first error rate.

Based on the real embedding information that has undergone error correction by the error correction means 16, a majority decision means 18 executes a majority decision regarding each corresponding bit of the information bit, and makes an error correction according to the majority decision. At this time, the majority decision means 18 calculates an error rate, and stores the obtained error rate in a second area of the error rate record means 17 as a second error rate.

In this embodiment, each corresponding bit of the information bits is separated by 256 bits when paying attention only to the information bit, as shown in FIG. 2. For example, in order to make a majority decision regarding the first bit of the information bit, the majority decision is executed at the 1st bit of the 1st code term, at the 5th bit of the 13th code term, and at the 9th bit of the 25th code term.

Further, referring to the first and second areas of the error rate record means 17, the error rate calculation means 19 calculates a total error rate from the first and second error rates. The calculation method for the error rate may use the sum total simple.

When the calculation of the error rate calculation means 19 is completed, a falsification judgment means 20 compares the error rate calculated by the error rate calculation means 19 with a predetermined threshold (which is empirically determined). If the error rate exceeds the threshold, the falsification judgment means 20 judges that a falsification exists. If not, it judges that no falsification exists. The judgment result is returned to the control means 9.

Figure 3:
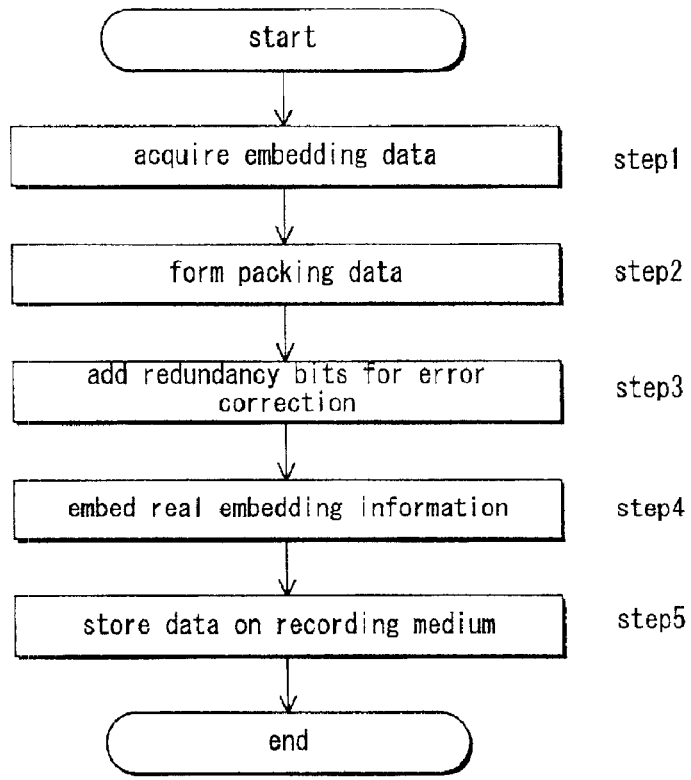
FIG. 3 is a flowchart showing the embedding process of a digital watermark according to the embodiment.

Next, the embedding process of a digital watermark is described with reference to FIG. 3. First, in step 1, the embedding data input means 1 acquires embedding data. Based on the embedding data, the packing data generation means 2 forms packing data (step 2). Thereafter, in step 3, the redundancy bit addition means 3 adds each redundancy bit to form real embedding information.

In step 4, the embedding means 6 embeds the real embedding information into the image data that has passed through the image data input means 4 and the pixel block division means 5. The compression/modulation means 7 compresses and modulates the result, and thereafter the pickup portion 13 stores data on the recording medium 12 (step 5).

Figure 4:
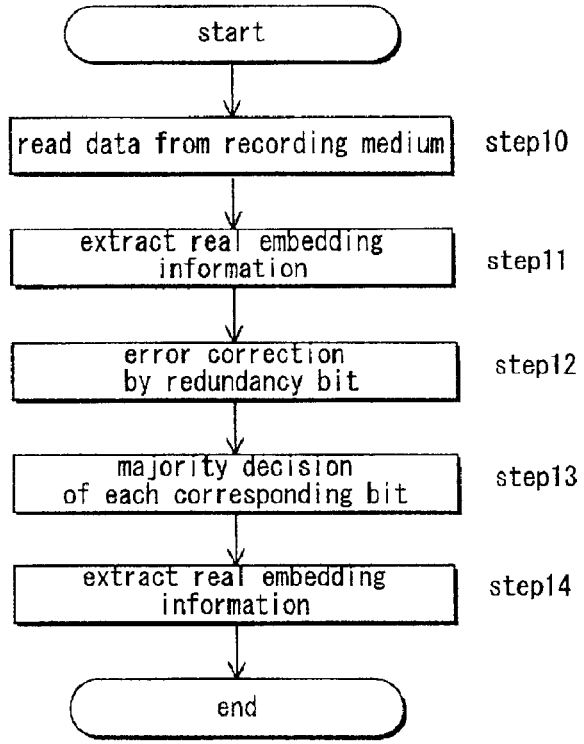
FIG. 4 is a flowchart showing the extracting process of the digital watermark.

Next, the extracting process of the digital watermark is described with reference to FIG. 4. First, in step 10, the pickup portion 13 reads information from the recording medium 12, and the extension/demodulation means 14 extends and demodulates it. Thereafter the information is input to the real embedding information detection means 15. In step 11, the real embedding information detection means 15 extracts real embedding information. The error correction means 16 then makes an error correction using the redundancy bit (step 12). The majority decision means 18 then makes an error correction according to the majority decision on each corresponding bit of the information bit (step 13). The real embedding information is extracted and output to the control means 9 (step 14).

Figure 5:
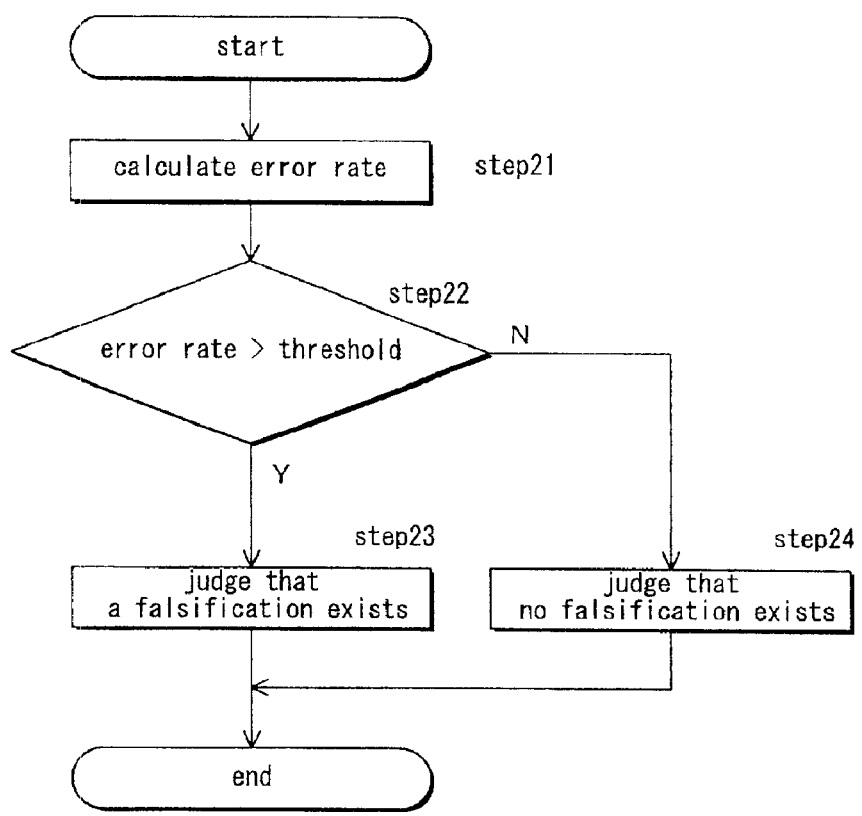
FIG. 5 is a flowchart showing a falsification judging process.

Next, a falsification judgment process is described with reference to FIG. 5. First, when the first and second error rates are stored on the error rate record means 17, the error rate calculation means 19 calculates a total error rate in step 21, and outputs the result to the falsification judgment means 20. In step 22, the falsification judgment means 20 compares the error rate calculated by the error rate calculation means 19 with a predetermined threshold. If the error rate exceeds the threshold, the falsification judgment means 20 judges that a falsification exists (step 23). If the error rate is lower than the threshold, the falsification judgement means 20 judges that no falsification exists. (step 24).

As is apparent from a comparison between FIG. 2 and FIG. 6, the real embedding information of the prior art in FIG. 6 is 1209 bits and, in contrast, the real embedding information of FIG. 2 is only 1147 bits. Accordingly, it will be understood that a saving of 5% or more is realized in the present invention compared to the prior art in spite of the fact that the code term lengths or the lengths of the embedding data are identical to each other.

Further, it is a noteworthy fact the prior art system of FIG. 6 uses three sets of padding, whereas the present invention in FIG. 2 uses only one. Accordingly, efficient processing can be carried out in the present invention.

Further, the same unit data is monotonously repeated in FIG. 6, which means high regularity. However, in FIG. 2, such unit data does not exist, and regularity is low. The low regularity adds complexity to one attempting to decode the information.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A digital watermark embedding method comprising the steps of:

acquiring embedding data to be embedded as a digital watermark;

forming packing data in which said embedding data is repeatedly connected at least three times to be sequential without interval;

forming real embedding information in which redundancy bits with a fixed length that are used for error correction of information bits are added immediately after said information bits in which said packing data is subdivided into data each having a fixed length; and embedding real embedding information into image data.

2. The digital watermark embedding method of claim 1, further comprising the step of encrypting said embedding data.

3. The digital watermark embedding method of claim 1, further comprising the steps of:

interleaving said real embedding information; and thereafter multiplexedly embedding said real embedding information.

4. A digital watermark extracting method for extracting a digital watermark from image data into which said digital watermark is embedded according to the digital watermark embedding method as set forth in claim 1, the digital watermark extracting method comprising the steps of:

extracting real embedding information from said image data;

cutting real embedding information into code terms having a fixed length;

making an error correction of information bits located at a front of redundancy bits using redundancy bits located at an end of the code term length, and thereby obtaining information bits that have undergone error correction;

executing a majority decision for each corresponding bit of the obtained information bits, and making an error correction by majority decision; and treating said information bits that have undergone said error correction by said majority decision as data embedded in an image.

5. A recording medium for recording image data, said recording medium including a data structure stored thereon, said image data being formed from embedding data into an original image data as a digital watermark, said data structure comprising:

an area for storing subdivided data, said subdivided data being formed from subdividing packing data into data each having a fixed length, the packing data being formed from repeatedly connecting said embedding data at least three times sequentially without interval; and an area for storing redundancy bits with a fixed length that are used for error correction of information bits;

wherein said area for storing said redundancy bits is arranged immediately after said area for storing said subdivided data.

6. The recording medium of claim 5, wherein said embedding data is encrypted.

7. The recording medium of claim 5, wherein said embedding data is interleaved.

8. An image recording device comprising:

embedding data input means for acquiring embedding data to be embedded as a digital watermark;

packing data forming means for forming packing data in which said embedding data is repeatedly connected at least three times sequentially without interval;

redundancy bit addition means for subdividing said packing data into subdivided data, each having a fixed length, and thereafter adding redundancy bits with a fixed length that are used for error correction of information bits immediately after said subdivided data each having the fixed length to output real embedding information;

embedding means for embedding said real embedding information into image data; and output means for writing information onto a recording medium on the basis of said image data in which said real embedding information is embedded.

9. The image recording device of claim 8, further comprising means for encrypting said embedding data.

10. The recording medium of claim 8, further comprising means for interleaving said real embedding information, and thereafter multiplexedly embedding said real embedding information.

11. The image recording device of claim 8, further comprising image data input means for outputting said image data.

12. The image recording device of claim 11, wherein said image data input means includes image pickup means.

13. An image replaying device comprising image signal output means for outputting an image signal on the basis of information read from a recording medium that records an image concerned in which a digital watermark is embedded as real embedding information, comprising:

means for acquiring said real embedding information containing embedding data to be embedded as a digital watermark;

means for repeatedly connecting packing data in which said embedding data is repeatedly connected at least three times sequentially without interval; and means for subdividing said packing data into subdivided data, each having a fixed length, and thereafter adding redundancy with a fixed length that are used for error correction of information bits immediately after said subdivided data each having the fixed length to output real embedding information.

14. The image replaying device of claim 13, further comprising means for encrypting said embedding data.

15. The image replaying device of claim 13, further comprising means for interleaving said real embedding information, and thereafter for multiplexedly embedding said real embedding information.

16. The image replaying device of claim 13, further comprising a display device for making a display on the basis of an image signal output by said image signal output means.

17. The image replaying device of claim 13, further comprising:

real embedding information detection means for extracting real embedding information embedded in information read from said recording medium on the basis of said information;

error correction means for making an error correction by said redundancy bits with respect to said real embedding information; and majority decision means for executing a majority decision for each corresponding bit of said information bits with respect to said real embedding information that has been corrected by said error correction means, and making an error correction by said majority decision.

18. The image replaying device of claim 17, further comprising:

error rate calculation means for calculating an error rate of image data concerned with reference to an error rate in said error correction by said redundancy bits and an error rate in said error correction by majority decision; and falsification judgment means for comparing an error rate of image data concerned calculated by said error rate calculation means with a predetermined threshold, and, if the error rate of image data concerned exceeds said threshold, judging that a falsification exists, and, if not, judging that no falsification exists.

* * * * *